United States Patent Office 3,491,037
Patented Jan. 20, 1970

3,491,037
CELLULOSE ESTER SPINNING SOLUTIONS AND ARTICLES THEREFROM CONTAINING CROSS-LINKING AGENT AND LATENT CATALYST
Paul H. Keys and James R. G. Pearman, Kingsport, Tenn., assignors to Eastman Kodak Company, Rochester, N.Y., a corporation of New Jersey
No Drawing. Continuation of application Ser. No. 491,007, Sept. 28, 1965. This application Feb. 3, 1969, Ser. No. 805,085
Int. Cl. C08g 37/32; C08b 21/08
U.S. Cl. 260—15
18 Claims

ABSTRACT OF THE DISCLOSURE

Cellulose esters containing hexamethoxymethylmelamine and a neutral catalyst that when subjected to heat will become acidic in nature and catalyze a reaction of the hexamethoxymethylmelamine and the cellulose ester to thereby modify the ester. Also disclosed is a process for producing articles from the above identified composition.

---

This application is a streamlined-continuation application of U.S. patent application Ser. No. 491,007, filed Sept. 28, 1965, now abandoned.

This invention relates to new compositions of matter, and more particularly to new and useful compositions of matter comprising solutions of synthetic linear condensation polyesters. This invention is further concerned with new compositions of matter that are capable of being formed into useful articles such as fibers, yarns, ribbons, filaments, bristles, films and the like which have improved resilience, increased heat and light stability, a reduced affinity for moisture or solvents, and when woven into fabrics will have improved crease retention.

For the sake of simplicity and clarity the present invention will be described in detail only insofar as it is applied to the manufacture of fibers and filaments. However, it is to be realized that numerous other applications and uses exist for which the invention is particularly well suited, but that the specific description of each would unduly lengthen the specification without further clarifying the invention. Therefore, the invention is in no way intended to be limited by the following specific examples except insofar as they may be incorporated into the appended claims.

It is well known that certain synthetic linear condensation polyesters of the cellulose ester class are generally very good fiber forming compositions. However, they are subject to certain inherent disabilities which greatly restricts their utility as general purpose fibers. For example, these cellulose esters and the fibers prepared therefrom do not have a very high elastic recovery capability and are quite susceptible to heat, moisture and photodegradation. In the past many attempts have been made to find some method or means whereby these aforementioned inherent disabilities of fibers made from cellulose esters could be improved. Means of achieving this goal have usually centered around the addition of an inert or chemically active additive material to either (1) the solution from which the fibers are spun, or (2) to the fibers after they have been woven. The use of additives in the spinning solution has generally been unacceptable, however, since it usually results in a severe reduction in or complete loss of certain desirable physical properties such as, for example, the tensile strength of the fibers. On the other hand, the after-treatment of fibers and fabrics has likewise been objectionable since it too usually reduces the physical properties and in addition requires special handling steps.

According to the present invention it has been found that the overall quality and properties of cellulose ester fibers or filaments can be vastly improved without incurring a severe loss in tensile properties. This improved fiber is produced by adding hexamethoxymethylmelamine along with a special "neutral" or "blocked" catalyst to a "regular" cellulose ester spinning solution. The spinning solution is spun by conventional dry spinning techniques to produce a fiber which is then heated to cause the catalyst to become acidic. The acidic catalyst thus formed causes the hexamethoxymethylmelamine to react with the cellulose ester thereby forming a modified fiber having superior physical and chemical properties.

Therefore, an object of this invention is to disclose new compositions of matter which contain hexamethoxymethylmelamine as one active ingredient thereof.

A further object of this invention is to disclose a special catalyst which, when used with hexamethoxymethylmelamine and a cellulose ester, will produce a cellulose ester product that can be heat treated to produce a material having superior properties.

Another object of this invention is to disclose a cellulose ester spinning solution containing hexamethoxymethylmelamine which can be spun to produce a fiber having superior stability and resilience.

Yet another object of this invention is to disclose a method of producing a modified cellulose ester product containing hexamethoxymethylmelamine.

Yet still another object of this invention is to disclose a method whereby a cellulose ester fiber containing hexamethoxymethylmelamine can be treated to produce a superior yarn.

A further object of this invention is to produce a new cellulose ester fiber with a higher degree of resilience and a lower affinity for moisture than a fiber spun from a normal or comparable cellulose ester.

A still further object of this invention is to provide a cellulose ester fiber or yarn containing hexamethoxymethylmelamine which will hold a crimp, and when curled and exposed to high humidities will retain the curl to a higher degree than a regular fiber or yarn of the same ester.

An additional object of this invention is to provide a cellulose ester product containing hexamethoxymethylmelamine that has improved solvent resistance and light stability, a higher melting point, and better resistance to weathering than products produced from comparable cellulose esters.

Another object of this invention is to provide a novel cellulose ester yarn which when woven into a fabric will cause the fabric to have a higher crease retention than a comparable fabric of the same construction.

These and further objects and advantages of this invention will be more apparent upon reference to the accompanying specification, specific working examples, and appended claims.

The compound hexamethoxymethylmelamine has been known for some time and its use as a protective coating for various materials has been investigated quite extensively within the last few years. However, no method or means has heretofore been proposed or perfected whereby hexamethoxymethylmelamine could be successfully included as one active chemical ingredient in a cellulose ester spinning solution from which a fiber is to be spun. In fact, so far as is known its use in such a cellulose ester spinning solution has never even been considered by the fiber industry since the desirable results that are to be obtained, and which will be more fully set forth hereinbelow, are totally unexpected in view of the known properties of hexamethoxymethylmelamine. Another factor which also probably contributed to the fact that hexamethoxymethylmelamine has never been used in a cellulose ester spinning solution is its inherent chemical nature which, unless modified, will not enter into the necessary chemical reaction with the cellulose ester solution at the proper time to give the desired fiber.

As mentioned briefly hereinabove, this invention relates to the discovery that through the use of a heretofore unknown method and process, hexamethoxymethylmelamine, which has the following formula:

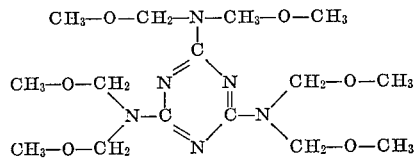

can be added along with a special blocked catalyst to a regular cellulose ester solution to give a novel spinning composition. This novel spinning solution can easily be spun by extruding it into an atmosphere of inert gas, which may be heated, where the motion of the inert gaseous atmosphere, the extruded fiber and the application of heat all aid in disposing of the volatile solvent in the solution thereby leaving a fiber of cellulose ester having incorporated therein hexamethoxymethylmelamine in a substantially unreacted or free state. However, once the newly spun fiber is subjected to a heat treatment step the hexamethoxymethylmelamine reacts to form a modified cellulose ester fiber having superior chemical and physical properties.

Although the exact mechanism and reaction that occurs in the fiber is not known it is believed that the heating step releases the block acidic catalyst which, in turn, promotes a reaction between the hexamethoxymethylmelamine and the hydroxyls of the cellulose ester to form cross-links. This theory would seem to be valid in view of the facts set out hereinbelow.

An investigation of hexamethoxymethylmelamine revealed that it is somewhat reactive by itself, but that its reactivity must be increased and modified by a substantial amount before it can be used with a cellulose ester spinning solution for forming superior fibers. It was found that one way in which the reactivity of hexamethoxymethylmelamine with cellulose esters could be improved was by lowering the pH of the system. However, the direct lowering of the pH, as by the addition of an acid catalyst to a spinning solution of hexamethoxymethylmelamine and a cellulose ester, produced an immediate and uncontrollable reaction which formed gels and thus rendered the solution useless. Therefore considerable research was directed toward finding some method or procedure whereby the reactivity of hexamethoxymethylmelamine with a cellulose ester spinning solution could be increased, but at the same time controlled so that the formation of undesirable gels did not occur. This research work resulted in the finding that an acid catalyst such as p-toluene sulfonic acid can be temporarily deactivated or neutralized by reacting it with a compound containing an oxirane group such as epoxidized oil that is, an oil having an oxirane oxygen group

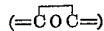

and that this "blocked" catalyst, if included in the spinning solution, could be used to promote a delayed reaction between the hexamethoxymethylmelamine and cellulose ester once the fiber is formed.

The temporary deactivation of the acid catalyst is thought to occur through the oxirane group of the oil that is, an oil having an oxirane oxygen group

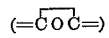

tying up the acid group which can later be freed or reactivated through the application of heat. To produce the temporary deactivated catalyst, the acid catalyst and the epoxidized oil are mixed in about stoichiometric proportions and allowed to stand for a sufficient period of time to assure that a complete reaction has occurred. Once the reaction has occurred the catalyst is in a "neutral" state and is ready to be added directly to a spinning solution containing the hexamethoxymethylmelamine.

One type of epoxidized oil that has been found to be a particularly good source of the oxirane group for use in forming the temporarily deactivated acidic catalyst is sold under the trade name Epoxol 9–5. Epoxol 9–5 is also compatible with the cellulose esters used. Obviously other materials or oils could be used as long as they will (1) furnish an oxirane group for reacting with the acidic catalyst to form the desired reversible, normally neutral catalyst product, and (2) are compatible with the spinning solution in which the reversible blocked catalyst is to be used.

Although p-toluene sulfonic acid is preferred as the base acid from which the blocked catalyst is to be formed it should be realized that other such acids which will react properly with an oxirane group radical and can later be restored to an acidic or active condition by heating for promoting a reaction between the hexamethoxymethylmelamine could be used. Examples of other acids which can be used are: phenyl acid phosphate, butyl acid phosphate, oxalic acid, benzene sulfonic, and monobutyl acid maleate.

In the practice of the present invention anywhere between 5 percent and 50 percent by weight of the hexamethoxymethylmelamine, which can be purchased under the trade name of Cymel 300 and Cymel 301, is added to a suitable cellulose ester spinning solution. The exact amount of hexamethoxymethylmelamine used in the spining solution will be determined by such factors as the properties desired, compatibility of the materials, and by economic considerations. In general, however, the moisture regain, tenacity, and elongation of the heat treated fibers are reduced as the percentage of hexamethoxymethylmelamine is increased. The elastic recovery of the heat treated fibers also increases as the percentage of hexamethoxymethylmelamine in the fibers increases.

A further understanding of the invention will be had from a consideration of the following examples that may be used in actual commercial practice and are set forth to illustrate certain preferred embodiments.

EXAMPLE 1

A conventional cellulose ester spinning solution was prepared by placing a sample of cellulose containing 39.4 percent acetyl in an acetone solvent. Half of this cellulose ester spinning solution was then spun on conventional dry spinning equipment to produce a 4 denier/filament (d./f.) yarn which was used as a control standard. To the second half of this spinning solution was added 20 percent by weight of hexamethoxymethylmelamine (Cymel 300). All percentages given are based on the weight of cellulose acetate in the solution. When this hexamethoxymethylmelamine was well mixed into the cellulose ester spinning solution, 0.10 percent by weight of a temporarily inactivated or neutralized acid catalyst formed from a 1:1 mixture of p-toluene sulfonic acid and epoxidized oil (Epoxol 9–5) in acetone was added to the solution. It should be realized that additional amounts in excess of 0.10 percent of the catalyst could be used, as for example up to 10 percent, if necessary to produce the desired reaction without damaging the fibers to be spun. After the cellulose spinning solution and the liquid additives had been thoroughly mixed, the mixture was spun as 4 d./f. yarn in the same manner as the control sample.

The control and modified fibers were then "heatset" in a relaxed state for 10 minutes at 150° C. The heatset and unheatset samples were checked for tensile properties (on an Instron tensile tester) and for moisture regain. During these tests breaks were made at an elongation rate of 100 percent per minute. Elastic recovery of the fibers was measured from 6 percent extension. The results of these and certain other conventional tests are tabulated below:

| Sample Identification | Den. | Tenacity, g./d. | Percent Elon. | Percent Elastic Recovery | Percent Moisture Regain | Stick Point, °C. |
|---|---|---|---|---|---|---|
| Unheatset Control | 148.0 | 1.26 | 34.4 | 70.6 | 6.09 | 213 |
| Heatset Control | 148.0 | 1.23 | 35.0 | 76.6 | 5.17 | 211 |
| Unheatset Modified | 148.5 | 1.14 | 30.3 | 75.1 | 5.24 | 268 |
| Heatset Modified | 149.3 | 1.19 | 29.6 | 91.2 | 3.91 | 246 |

As will be noted, the elastic recovery of the heatset modified acetate containing hexamethoxymethylmelamine is far greater than that of the heatset control which did not contain the hexamethoxymethylmelamine. Also, the moisture regain of the heatset modified acetate is considerably lower than that of the control. It is also noteworthy that the stick point of the heatset modified fiber was 35° C. higher than the heatset control, and that the stick point of the unheatset modified fiber was 22° C. higher than the heatset modified fiber. Even though the tenacity and elongation properties of the modified cellulose ester fiber was somewhat reduced, they are nevertheless quite adequate to permit the fibers to be processed into fabrics.

In order to further test the accuracy of the theory that the hexamethoxymethylmelamine reacted with the cellulose ester to form cross-links, the modified fiber was extracted with diethyl ether before and after heatsetting. The unheatset fiber had about 14 percent extractables while the heat set fiber had about 5 percent extractables. This combined with the fact that the denier did not change with heatsetting is conclusive proof that the hexamethoxymethylmelamine had reacted.

Obviously, various other acylated esters of cellulose besides that of acetyl could be used to form the spinning solution. For example, any of the acylated esters of cellulose where the acyl group is acetyl, propionyl, butyryl, or combinations thereof can be used. It should also be equally apparent that various temperatures and/or time variations over that given for heatsetting the fibers could be used as long as the combination of the two will cause the acid catalyst to be released and does not melt or otherwise damage the fiber being treated.

EXAMPLE 2

A modified cellulose acetate yarn and a control were made in the same manner as those of Example 1. These fibers were woven as filling in a 5 harness satin fabric and exposed under glass in an Atlas Weather-Ometer for 2000 hours. One inch ravel strips of the unexposed and exposed fabrics were broken in the filling direction on the Scott tester. The control fabric retained 20 percent of the original toughness while the modified sample retained 59.5 percent of the original toughness. "Toughness" as used hereinabove is defined as the product of breaking strength and elongation.

EXAMPLE 3

A modified cellulose acetate spinning solution was prepared in the same manner as that in Example 1. This solution and a regular solution were spun as 150 denier 38 filament yarn on conventional dry spinning equipment. These fibers were heatset in a relaxed state for 10 minutes at 150° C. Samples of heatset control and modified yarn were placed in acetone, methylene chloride, and dimethyl acetamide. In all cases the control was dissolved but the modified acetate was not dissolved. The unheatset modified fiber was also dissolved by all solvents thus further verifying the fact that the hexamethoxymethylmelamine does react with the cellulose ester to form a cross-linked polymer. This example also clearly illustrates the resistance of the modified cellulose ester to solvents that will normally damage or destroy a cellulose article.

EXAMPLE 4

A spinning solution of cellulose acetate-butyrate containing 10 percent of hexamethoxymethylmelamine was prepared as in Example 1. This material was spun into 4 d./f. yarn. These yarns were heatset for 3 minutes at 150° C., cooled and then immersed in acetone. The control yarn was dissolved while the modified yarn was not. Therefore, it can again be concluded that not only has a reaction occurred in the modified yarn, but that the modified yarn is resistive to solvents that normally destroy cellulose ester fibers.

EXAMPLE 5

Samples of unheatset control and modified yarns made in accordance with Example 3 were wound on a 3/8" diameter steel rod and heatset in an oven for 5 minutes at 160° C. The samples were removed from the oven, allowed to cool, and then removed from the rod. Both samples were curled and resembled the curls in doll hair. Both samples were immersed in water at 30° C., hung by one end and allowed to dry. The regular acetate control lost all curl while the modified acetate fiber retained essentially all the original curl. Thus the modified fibers clearly retains a "set" better than a normal cellulose ester filament.

EXAMPLE 6

A sample of regular cellulose acetate fiber and a modified cellulose acetate fiber were prepared as in Example 1. These samples were heatset for 5 minutes at 175° C. and then knitted into socks. The socks were pleated on a Hoffman press using 60 p.s.i. steam and then washed and tumble dried for 5 cycles. The modified sample retained a sharp, well defined pleat while the control had no pleat whatever. Thus, the superior crease retention of the modified fiber over that of other "standard" cellulose ester fibers is clearly evidenced.

From the foregoing it is readily apparent that this invention permits hexamethoxymethylmelamine to be successfully mixed and reacted with a cellulose ester to form various products having superior chemical and physical properties. This reaction between the hexamethoxymethylmelamine and cellulose ester is accurately controlled through the unique use of a blocking catalyst so that no gel formed, nor does the cross-linking take place until the cellulose ester article is properly formed. This permits articles having superior crease or other position retention properties to be readily produced. Furthermore, this controlled reaction of the compositions permits the cellulose ester materials to be used with suitable fillers to prepare molding compositions which may be hardened by the use of heat and pressure.

This invention may be embodied in other specific forms without departing from the spirit or essential characteristics thereof. The present embodiments are therefore to be considered in all respects as illustrative and not restrictive.

We claim:

1. A composition of matter capable of being made substantially solid by heat comprising a cellulose ester, hexamethoxymethylmelamine, and the reaction product of an acid and a compound containing oxirane groups, which product will decompose upon heating to change the pH of the composition to an acidic value thereby causing a reaction to occur between the hexamethoxymethylmelamine and the cellulose ester.

2. A solution of the composition of matter of claim 1.

3. A composition of matter capable of being made substantially solid by heat comprising an ester of cellulose in a solvent base, about 5 to 50 percent by weight of hexamethoxymethylmelamine, and the reaction product of an acid and compound containing oxirane groups, which product becomes acidic when heated.

4. A composition of matter capable of being made substantially solid by heat comprising an acylated ester of cellulose in a solvent base, about 5 to 50 percent by weight of hexamethoxymethylmelamine, and a temporarily inactivated acidic hardening catalyst formed by mixing an oil containing oxirane groups with an acid that will react therewith so that the oxirane group is bonded to the acid group of the acid.

5. A composition of matter according to claim 4 wherein the acid is selected from the group consisting of p-toluene sulfonic, phenyl acid phosphate, butyl acid phosphate, oxalic, benzene sulfonic, and monobutyl acid maleate.

6. A composition of matter according to claim 4 wherein the acyl group of the acylated ester of cellulose is selected from the group consisting of acetyl, propionyl, butyryl, or combinations thereof.

7. A composition of matter capable of being made substantially solid by heat comprising an acylated ester of cellulose dissolved in acetone, about 5 to 50 percent by weight of hexamethoxymethylmelamine, and a heat activatable acidic hardening catalyst formed by the reaction of an oil containing oxirane groups and an acid selected from the group consisting of p-toluene sulfonic, phenyl acid phosphate, butyl acid phosphate, oxalic, benzene sulfonic, and monobutyl acid maleate.

8. A spinning solution essentially consisting of a cellulose ester having at least one acyl group selected from the group consisting of acetyl, propionyl or butyryl, approximately 5 to 50 percent by weight of hexamethoxymethylmelamine, and the reaction product of an acid and a compound containing an oxirane group, which product will decompose upon heating at a temperature lower than the melting point of the ester to produce an active acidic catalyst.

9. A spinning solution according to claim 8 wherein said reaction product is formed by reacting an acid selected from the group consisting of p-toluene sulfonic, phenyl acid phosphate, butyl acid phosphate, oxalic, benzene sulfonic and monobutyl acid maleate with an oxirane reducing agent.

10. A spinning solution according to claim 9 wherein the oxirane reducing agent is an oil containing oxirane groups.

11. A spinning solution according to claim 8 wherein about 1 percent by weight of said reaction product is mixed with the spinning solution.

12. A process of producing articles made from a cellulose ester which comprises mixing together from 5 to 50 percent by weight of hexamethoxymethylmelamine, the reaction product of an acid and a compound containing oxirane groups, which product becomes acidic when heated, and a cellulose ester dissolved in a solvent, forming said mixture in the shape of the article to be produced, and applying heat to the formed article so that said product becomes acidic thereby causing a reaction to occur between the hexamethoxymethylmelamine and the cellulose ester.

13. A process of producing articles having improved resilience comprising mixing together (1) a cellulose ester having at least one acyl group selected from the group consisting of acetyl, propionyl, or butyryl, (2) 5 to 50 percent by weight of hexamethoxymethylmelamine, and (3) about 1 percent by weight of a solution formed by mixing in about stoichiometric proportions an oil containing oxirane groups with an acid selected from the group consisting of p-toluene sulfonic, phenyl acid phosphate, butyl acid prosphate, oxalic, benzene sulfonic and monobutyl acid maleate; making the mixture into an article; and heating the article to a sufficient temperature to produce a chemical reaction between the cellulose ester and the hexamethoxymethylmelamine.

14. A process according to claim 13 wherein the temperature to which said article is subjected to is above 150° C.

15. A process according to claim 14 wherein said article is a fiber.

16. The method of improving the physical and chemical properties of a cellulose ester article comprising adding to the solution from which the article is formed a mixture of hexamethoxymethylmelamine and the reaction product of an acid and a compound containing oxirane groups, which product decomposes upon heating to produce an acidic material, and heating the article after it has been formed to decompose the product thereby causing the hexamethoxymethylmelamine to react with the cellulose ester.

17. The method according to claim 16 wherein the product is a mixture of an oil containing oxirane groups and an acid.

18. The product produced by the process of claim 12.

References Cited

UNITED STATES PATENTS

| 2,373,135 | 4/1945 | Maxwell | 260—856 |
| 2,375,838 | 5/1945 | Coolidge et al. | 260—15 |
| 2,485,160 | 10/1949 | Niedhauser et al. | |
| 2,598,767 | 6/1952 | Dolmetsch et al. | 260—15 |
| 2,606,880 | 8/1952 | Yourtee | 260—67.6 |
| 2,684,343 | 7/1954 | Dixon et al. | 260—15 |
| 2,959,559 | 11/1960 | Delius. | |
| 3,006,936 | 10/1961 | Findley et al. | |
| 3,086,949 | 4/1963 | Chatfield. | |
| 3,309,327 | 3/1967 | Gayer | 260—21 |

FOREIGN PATENTS

| 611,562 | 11/1948 | Great Britain. |

OTHER REFERENCES

Chem. Abst., vol. 51:4026e, "Ethoxyline Condensate Esterfied With Fatty Acid and Phosphoric Acid," N.V. de Bataafsche.

HAROLD D. ANDERSON, Primary Examiner

E. WOODBERRY, Assistant Examiner

U.S. Cl. X.R.

57—140; 161—265; 260—21